United States Patent [19]

Smotkin et al.

[11] Patent Number: 4,793,910
[45] Date of Patent: Dec. 27, 1988

[54] MULTIELECTRODE PHOTOELECTROCHEMICAL CELL FOR UNASSISTED PHOTOCATALYSIS AND PHOTOSYNTHESIS

[75] Inventors: Eugene Smotkin; Allen J. Bard; Marye A. Fox, all of Austin, Tex.

[73] Assignee: Gas Research Institute, Chicago, Ill.

[21] Appl. No.: 51,469

[22] Filed: May 18, 1987

[51] Int. Cl.$^4$ .................. C25B 1/04; C25B 9/04; H01M 6/30

[52] U.S. Cl. .................. 204/268; 204/270; 204/DIG. 3; 204/129; 429/111

[58] Field of Search ............ 204/129, 268, 269, 270, 204/DIG. 3, 248; 429/111

[56] References Cited

U.S. PATENT DOCUMENTS

| | | | |
|---|---|---|---|
| 4,021,323 | 5/1977 | Kilby et al. | 204/129 |
| 4,042,758 | 8/1977 | Weinstein et al. | 429/111 |
| 4,061,555 | 12/1977 | Miyatani et al. | 204/242 |
| 4,090,933 | 5/1978 | Nozik et al. | 204/129 |
| 4,094,751 | 6/1978 | Nozik et al. | 204/129 X |
| 4,100,051 | 7/1978 | Kilby et al. | 204/266 |
| 4,124,464 | 11/1978 | Miyatani et al. | 204/129 |
| 4,128,704 | 12/1978 | McKinzie et al. | 429/111 |
| 4,136,436 | 1/1979 | Kilby et al. | 29/572 |
| 4,167,461 | 9/1979 | Dickson et al. | 204/102 |
| 4,181,593 | 1/1980 | McKinzie et al. | 204/290 F |
| 4,181,754 | 1/1980 | McKinzie et al. | 427/74 |
| 4,203,814 | 5/1980 | Grantham | 204/129 |
| 4,215,182 | 7/1980 | Ang et al. | 429/15 |
| 4,236,984 | 12/1980 | Grantham | 204/129 |
| 4,288,502 | 9/1981 | Avigal et al. | 429/111 |
| 4,315,973 | 2/1982 | Manassen et al. | 204/275 X |
| 4,357,400 | 11/1982 | Appleby | 429/111 |
| 4,368,216 | 1/1983 | Manassen et al. | 429/111 X |
| 4,400,451 | 8/1983 | Gordon | 429/111 |
| 4,414,080 | 11/1983 | Williams et al. | |
| 4,419,278 | 12/1983 | Gordon | 429/111 X |
| 4,437,954 | 3/1984 | Sammells et al. | 204/129 |
| 4,466,869 | 8/1984 | Ayers | 204/129 |
| 4,492,743 | 1/1985 | Howe | 429/111 |
| 4,501,804 | 2/1985 | Bockris et al. | 429/111 |
| 4,521,499 | 6/1985 | Switzer | 429/111 |
| 4,521,800 | 6/1985 | Howe | 357/67 |
| 4,534,099 | 9/1985 | Howe | 29/572 |
| 4,592,807 | 6/1986 | Switzer | 204/2.1 |

OTHER PUBLICATIONS

Honda et al., Nature, 238:37 (1972).
Wrighton, Proc. Nat. Acad. Sci., 72:1518 (1975).
White et al., J. Electrochem. Soc., 131:544 (1985).
Smotkin et al., J. of Phys. Chem. 91:6 (Jan. 14, 1987).
Dialog and Lexis search.
Smotkin et al., J. of Phys. Chem., 90:4604 (Sep. 11, 1986).

Primary Examiner—Donald R. Valentine
Attorney, Agent, or Firm—Arnold, White & Durkee

[57] ABSTRACT

A multielectrode photoelectrochemical cell in which at least contains two bipolar electrode panels for photoelectrochemical reactions such as water photolysis to produce $H_2$ $O_2$ without external bias. In one embodiment of the present invention, a bipolar $TiO_2$/Pt multielectrode photoelectrochemical cell was fabricated with five panels in series. The cell permitted unassisted photolytic (Xe lamp) water splitting to produce $H_2$ and $O_2$ with $H_2O_2$ molar ratio of 2.4/1.

23 Claims, 8 Drawing Sheets

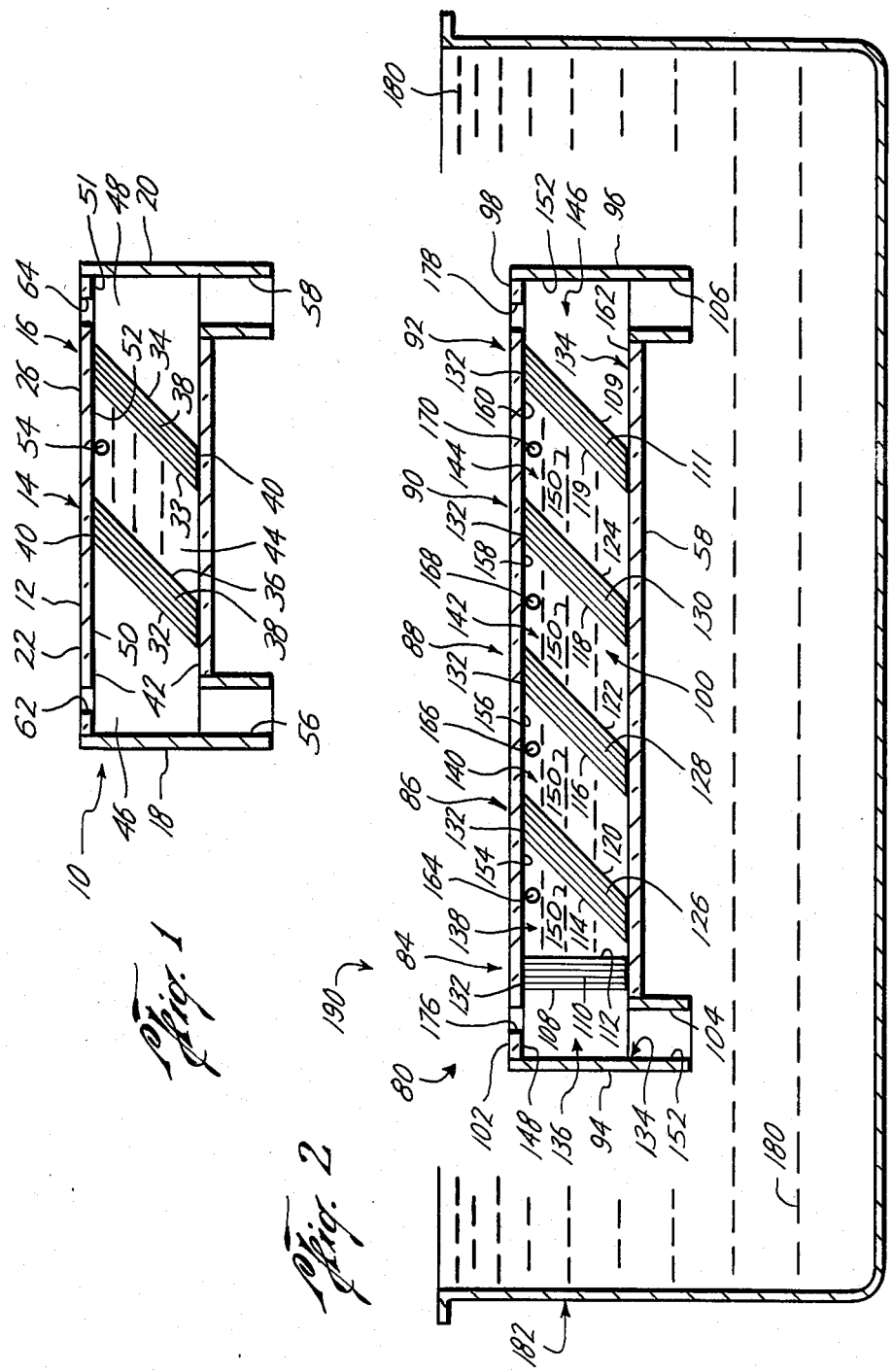

A. DARK

B. UNDER ILLUMINATION

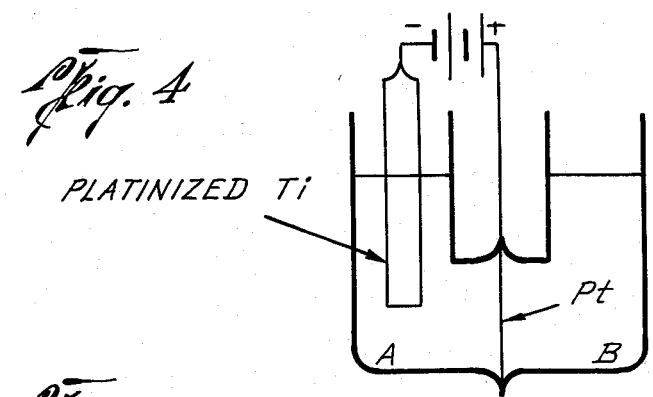
Fig. 4
Fig. 5
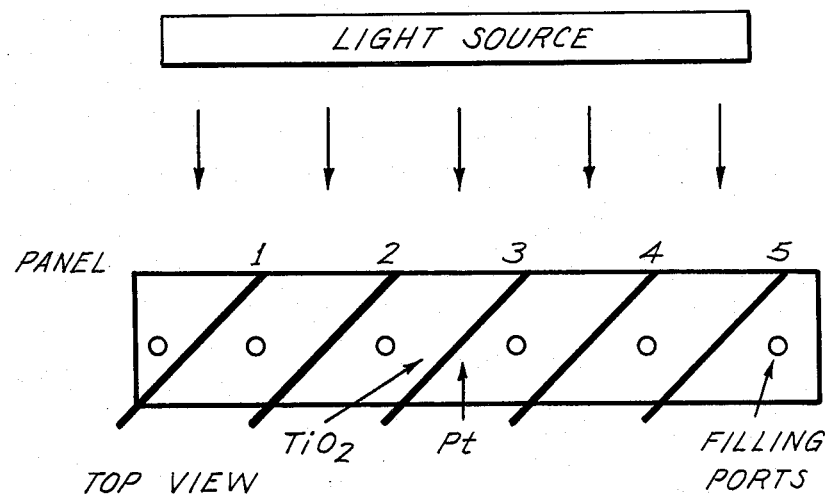
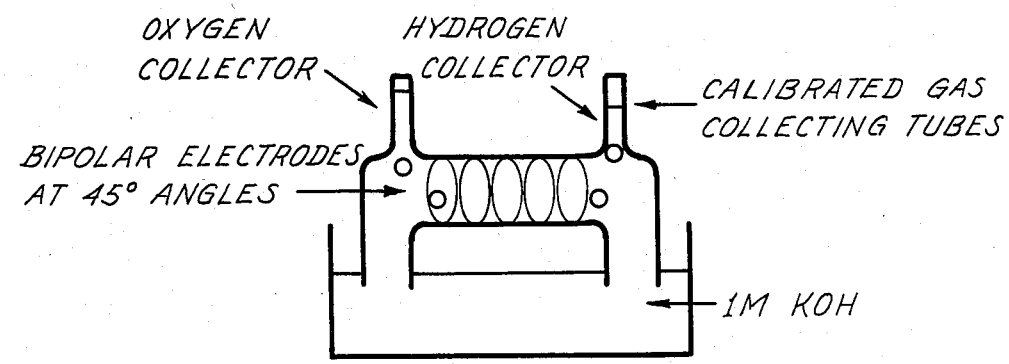
Fig. 6

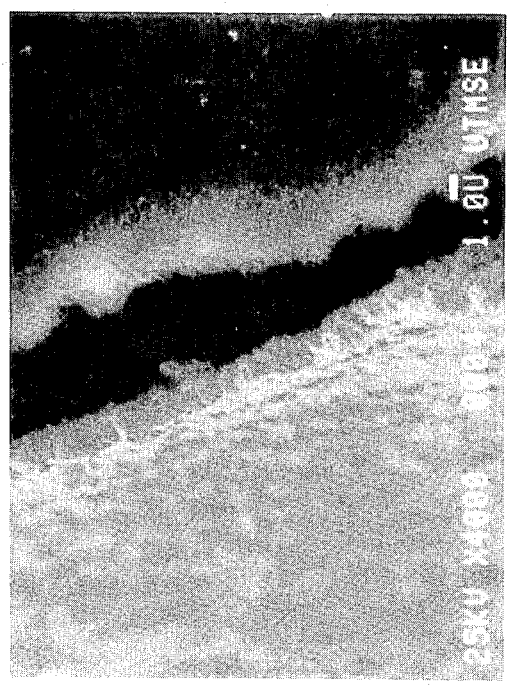
TiO$_2$/Ti INTERFACE
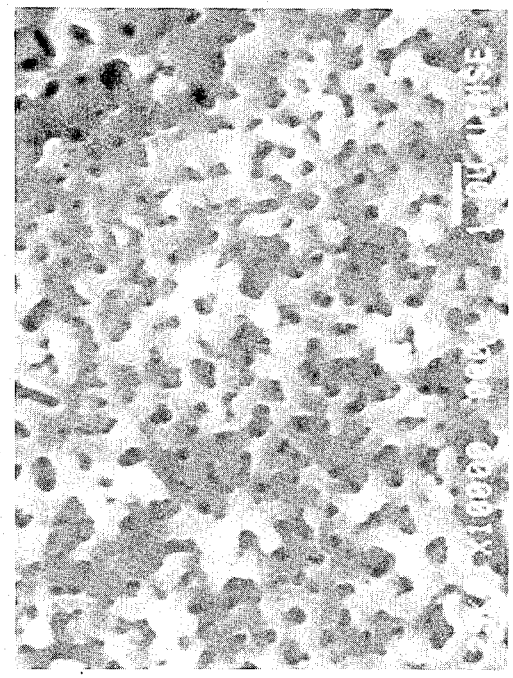
ANODIZED TiO$_2$ SURFACE
Fig. 7

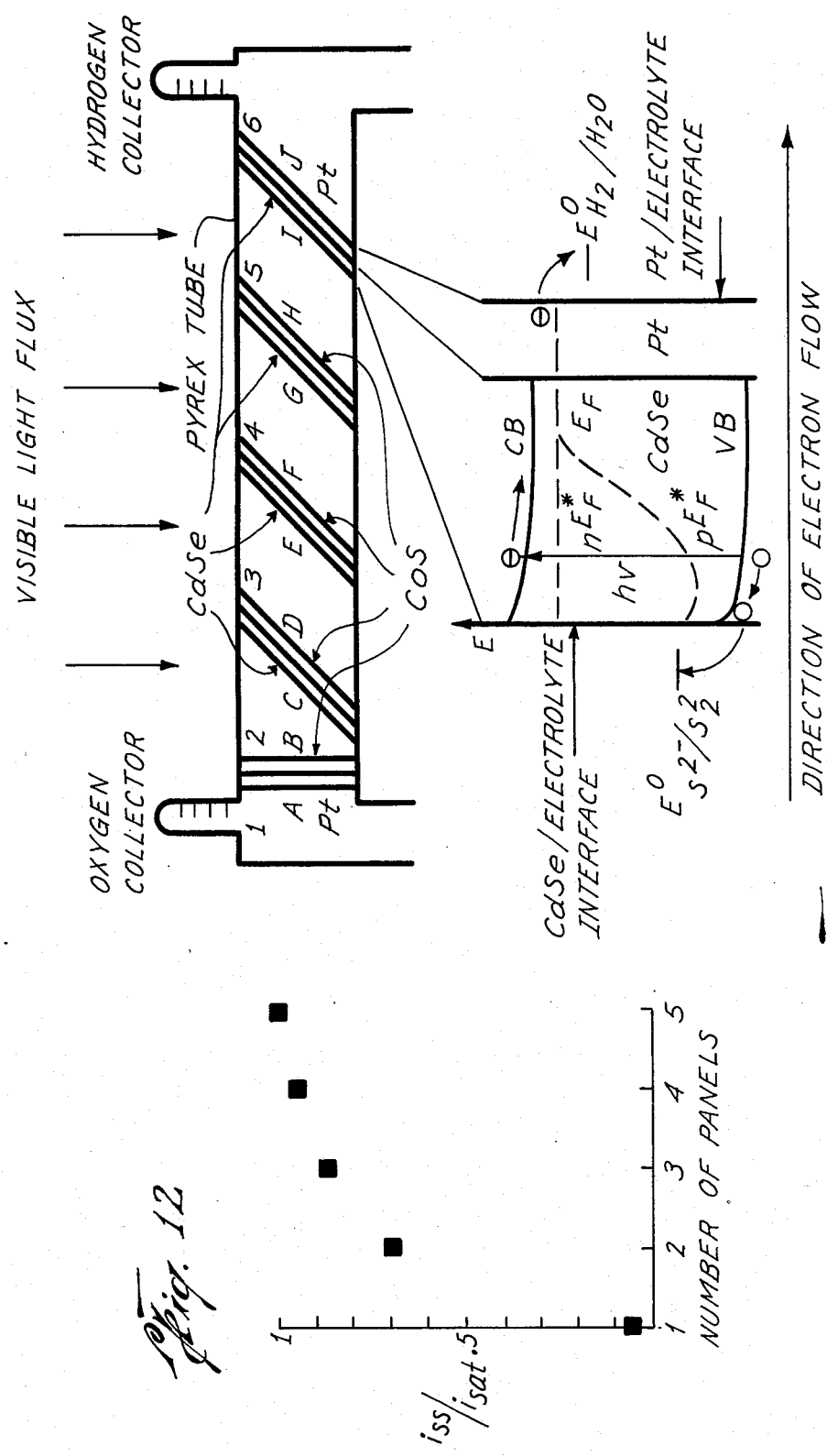

MULTIELECTRODE PHOTOELECTROCHEMICAL CELL FOR UNASSISTED PHOTOCATALYSIS AND PHOTOSYNTHESIS

BACKGROUND OF THE INVENTION

The present invention relates to photolytically-induced decompositions such as water photoelectrolysis, particularly with a multielectrode semiconductor photoelectrochemical cell capable of unassisted photolytic water splitting to form $H_2$ and $O_2$ and methods of making and using same. The present invention does not require that the semiconductor have a flatband potential more negative than the reduction potential of $H_2O$ or that the semiconductor be stable with respect to photooxidation while evolving oxygen.

Photolytically induced decompositions, particularly the photolysis of water into $H_2$ and $O_2$ using solar radiation, have received extensive attention and various photoelectrochemical devices and methods for this purpose have been developed. However, in many cases, an expenditure of electrical or chemical energy in addition to incident radiant (e.g., solar) energy is required. Because the potential developed by a single photoelectrode in these devices is inadequate to drive the water splitting reaction at a useful rate with visible light, an external bias has been necessarily applied. This bias has been either an external electrical potential or a chemical bias established by contacting semiconductor sides of bipolar photoelectrodes with a strong alkali and metallic sides with a strong acidic solution. Although it is known that connecting several photoactive junctions in series may generate sufficient driving force to decompose $H_2O$ to $H_2$ and $O_2$ without an external bias, there are still some problems related to earlier devices such as complicated construction or difficulties in the separation and collection of $H_2$ and $O_2$, thus impeding practical application. Examples of attempted practical photoelectrochemical devices are seen in White et al., (J. Electrochem. Sol. Vol. 132, p 544 (1985)), and in U.S. Pat. No. 4,094,751, issued June 13, 1978.

Studies of water photoelectrolysis ("water splitting") with $TiO_2$ and Pt electrodes date from the work of Honda et al., (Nature, (1972), v. 238, pp. 37). Because the potential developed by platinized $TiO_2$ is inadequate to drive the water splitting reaction at a useful rate, an external bias must be applied. This bias can be either an external electrical potential or a chemical bias established by contacting the $TiO_2$ with a strong alkaline and the Pt with a strong acidic solution. (Wrighton, Proc. Nat. Acad. Sci., (1975), U.S.A., V 72, pp. 1518).

In such cases an expenditure of energy in addition to the incident radiant (e.g., solar) energy is required. An alternative strategy involves the utilization of one or more PEC cells to bias the water splitting cell. Earlier work (White et al., cited above) showed, for example, that this could be accomplished by coupling of Texas Instruments solar energy system arrays based on Si p/n junctions. Simpler types of bipolar electrodes, and arrays based on these, have not previously been described.

A photoelectrochemical device which is of relatively simple construction, allowing ready collection of $H_2$ and/or $O_2$ and not requiring any external bias has not, prior to the invention described herein, been developed for photolytically-induced decompositions such as the photolysis of water into $H_2$ and $O_2$ using light from, for example, solar radiation.

SUMMARY OF THE INVENTION

The present invention involves a multielectrode photoelectrochemical unit for unassisted photoelectrically-induced reactions. The photoelectrically-induced reaction of most general interest is the decomposition of water to hydrogen and oxygen, however many other photodriven reactions [e.g. that of brine to produce hydrogen, chlorine, and alkali] can be carried out. In one aspect the multielectrode photoelectrochemical unit comprises a wireless series of at least two photoactive bipolar electrode panels. The multielectrode photoelectrochemical unit characteristically comprises a housing and at least two photoactive bipolar electrode panels and may also include a means for collecting evolved gaseous photodecomposition products. The housing has at least one light-passing side, a first end, a second end and a housing wall defining an internal section. The term "light-passing" as used herein indicates light-transparent or light-translucent, so that substantially all incident light may pass on into the housing interior.

A first exterior photoactive bipolar electrode panel is mounted in the internal section so that the first electrode panel physically separates the internal section on each side of the first panel. Said first exterior photoactive bipolar electrode panel has a semiconductor side, an ohmic contact layer and an underside. This first exterior photoactive bipolar electrode panel is attached to the housing wall near the first end of the internal section with the semiconductor side oriented toward the first end and partially forming a first terminal compartment.

A second exterior photoactive bipolar electrode panel is mounted in the internal section so that the second electrode panel physically separates the internal section on each side of the panel. Said exterior second photoactive bipolar electrode panel has a semiconductor side, an ohmic contact layer and a catalytic side and being attached to the housing wall near the second end of the internal section with the catalytic side oriented toward the second end and partially forming a second terminal compartment.

An internal compartment in said internal section is partially formed by the catalytic side of the first exterior photoactive bipolar electrode panel and the semiconductor side of the exterior second photoactive bipolar electrode panel. The first and second exterior photoactive bipolar electrode panels are attached to said housing walls to prevent liquid flow between the internal compartment and the terminal compartments. The exterior photoactive bipolar electrode panels are positioned in the internal section so that light from an external source entering the internal section is substantially incident upon their semiconductor sides. The internal compartment preferably comprises a closable port in the housing wall.

The semiconductor side of a usable photoactive bipolar electrode panel of the present invention preferably comprises a p-type semiconductor or a n-type semiconductor. The catalytic side of the photoactive bipolar electrode panels preferably comprises a catalyst such as platinum. The corresponding ohmic contact layer is a thin electrically conductive substance, preferably a metallic foil such as titanium foil.

A preferred multielectrode photoelectrochemical unit for unassisted photodecomposition comprises at least two internal compartments and at least one interior photoactive bipolar electrode panel. The housing of an interior photoactive bipolar electrode panel-containing unit is generally as described above.

A first exterior bipolar electrode panel is attached to the housing wall near the first end of the internal section of the housing, said first exterior bipolar electrode panel having a catalytic or gas-evolving side oriented toward the first end of the housing and partially forming a first terminal compartment. The first exterior bipolar electrode panel further comprises an ohmic contact layer and an internal side, and said first electrode panel extends across the internal section to physically separate the internal section on each side of the first electrode panel.

A second exterior bipolar electrode panel is attached to the housing wall near the second end of the housing. Said second exterior bipolar electrode panel has a gas-evolving side oriented toward the second end and partially forming a second terminal compartment. The second exterior bipolar electrode panel further comprises an ohmic contact layer and a semiconductor side. The gas-evolving sides of the exterior bipolar electrode panels are preferably catalytic for photodecomposition product formation, preferably a metallic catalyst, and ideally comprising platinum. The semiconductor sides comprise a p-type or n-type semiconductor, preferably a metal chalcogenide such as cadmium selenide or cadmium sulfide, for example, and said second electrode panel extends across the internal section to physically separate the internal section on each side of the second electrode panel.

Additionally, the interior photoactive bipolar electrode panel-containing multielectrode photoelectrochemical unit comprises at least one, preferably two, three or more, interior photoactive bipolar electrode panels. An interior bipolar electrode panel has a semiconductor side, an ohmic contact layer and an underside. The underside of terminal or interior bipolar electrode panels, particularly when the semiconductor is a metal chalcogenide, preferably comprises a substance compatible with metal chalcogenides, such as cobalt sulfide, lead sulfide or sulfurized brass, for example.

The interior photoactive bipolar electrode panel is attached to the housing wall in the internal section between the exterior bipolar electrode panels. The internal section is divided by interior and exterior bipolar electrode panels into at least two, preferably four, internal compartments.

The internal compartments each have a housing wall and two ends, each end consisting of a side of an interior or exterior bipolar electrode panel and the housing wall comprising a port for transfer of fluids in or out of the internal compartments. The ports are preferably closable and may be sealed to isolate internal compartments during immersion of the multielectrode photoelectrochemical unit in an electrolyte bath, for example.

The photoactive bipolar electrode panels, having a semiconductor side, are oriented so that light from an external source passing into the internal section is substantially incident, preferably fully incident, upon a majority of the semiconductor sides. This orientation may, for example, be an approximately equal slanting so that the photoactive semiconductor sides generally face toward a light passing side of the housing or may even be parallel to incoming light if effective light-scattering means are emplaced to assure incidence of incoming light on the photoactive semiconductor sides of the panels.

In a preferred embodiment, the interior photoactive bipolar electrode panel-containing multielectrode photoelectrochemical unit of the present invention comprises means for the collection of gaseous photodecomposition products. Such means, of types well-known to those skilled in the art, are connected to or incorporated in at least one terminal compartment.

A preferred use of the multielectrode photoelectrochemical unit of the present invention is for the photovoltaic decomposition of water to hydrogen and oxygen powered by solar energy. For this use, the bipolar electrode panels may have an the ohmic contact layer comprising a metallic foil, a semiconductor side comprising a metal chalcogenide, an underside comprising cobalt sulfide, lead sulfide or sulfurized brass and a gas-evolving side comprising platinum. The internal compartments are substantially filled with a first electrolyte such as a fluid polysulfide electrolyte. Such a unit may be immersed in an electrolyte bath containing a second electrolyte so that a salt bridge is formed between the gas-evolving sides of the exterior electrodes and then irradiated with a light source such as sunlight. Upon such irradiation, oxygen is generated at the gas-evolving side of the first exterior bipolar electrode and hydrogen at the gas-evolving side of the second exterior bipolar electrode. The gases may be collected.

BRIEF DESCRIPTION OF THE DRAWINGS

FIG. 1 shows a vertical cross-sectional view of an embodiment of the multielectrode photoelectrochemical unit of the present invention.

FIG. 2 shows a vertical cross-sectional view of a multielectrode photoelectrochemical unit comprising several internal compartments, the unit being immersed in an electrolyte bath.

FIG. 4 shows an anodization cell. Side A contains anodizing electrolyte (2.5M $H_2SO_4$) in contact with the Ti surface to be anodized, with a platinized Ti counter electrode. Side B contains ice water in contact with the platinized Ti surface.

FIG. 5 schematically shows a series array cell.

FIG. 6 schematically shows a water photoelectrolysis cell with five bipolar electrodes in series.

FIG. 7 shows scanning electron micrographs of anodized surface. A. $TiO_2$ treated surface; B. $TiO_2/Ti$ interface.

01. Oxygen reduction wave, Pt/KOH, $O_2$.
02. Sum of 2 01 curves yielding reduction wave for 2 panels.
03. Sum of 3 01 curves yielding reduction wave for 3 panels.

H1. Reduction wave for single panel in outgassed KOH solution.

O1H1 Reduction wave for H1 biased by O1.

O2H1 Reduction wave for H1 biased by two O1 panels.

A1 Anodic photocurrent for single panel.

A2 Anodic photocurrent for three panels in series.

A3 Anodic photocurrent for three panels in series.

Figure 11:
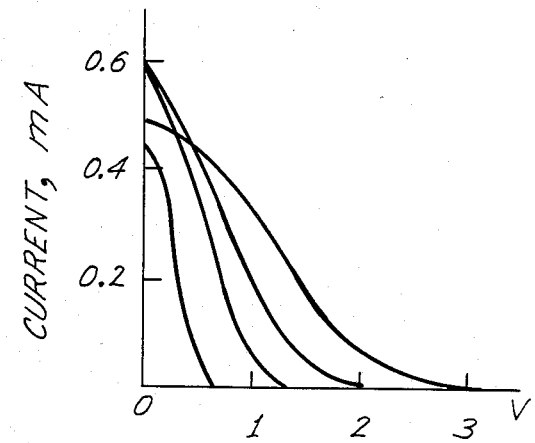

FIG. 11 shows power curves for $TiO_2$/Pt panels in series. Panel area, 1.0 $cm^2$, in 1M KOH with oxygen atmosphere. 266 $mW/cm^2$ xenon lamp illumination.

FIG. 12 shows $i_{sc}/i_{sat}$ vs. number of panels (1 $cm^2$) on 1M KOH.

FIG. 13 schematically shows a water photoelectrolysis cell. Expansion shows energetics of bipolar panel. A,J: PT; B,D,F,H: CoS; C,E,G,I: CdSe; Solutions: 1,6: KOH (1M); 2-5: $Na_2S$ (1M), S (1M), KOH (1M). For $H_2$ and $O_2$ generation solutions 1 and 6 are connected with KOH bridge.

Figure 14:
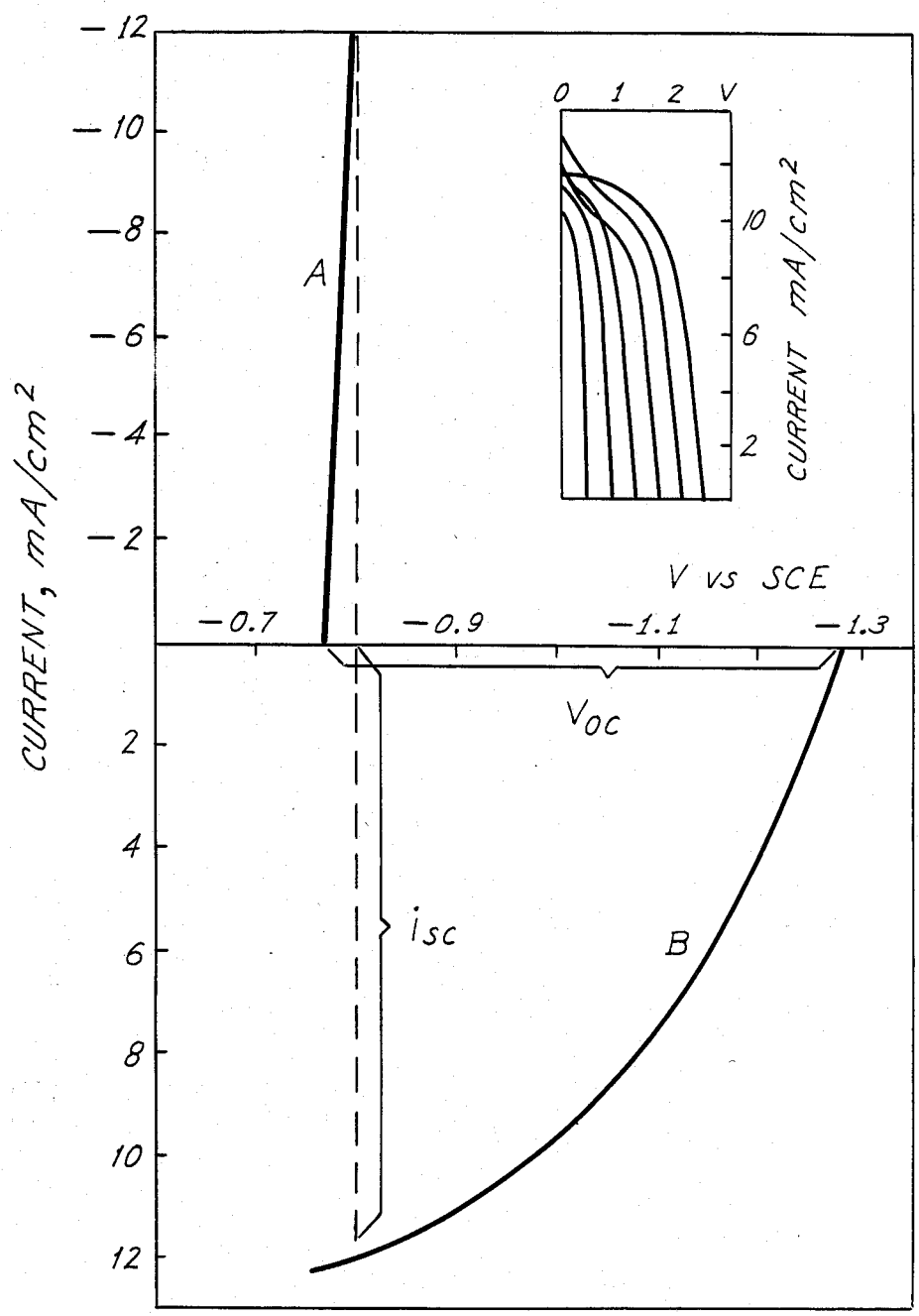

FIG. 14 shows current-potential characteristics of a CdSe//CoS panel in 1:1:1M KOH:S:$Na_2S$ solution. Curve A: polysulfide reduction on dark CoS surface. Curve B: Oxidation of polysulfide on illuminated CdSe surface. Effective solar flux: 67.0 $mW/cm^2$. Inset: power curves for water photoelectrolysis device used in water photolysis experiment with six photopanels and one dark CoS panel. Effective solar flux: 52.0 $mW/cm^2$. Projected area of each panel: 1.04 $cm^2$. $V_{oc}$'s are in order from left to right of panels 1 though 6 in series.

DESCRIPTION OF THE PREFERRED EMBODIMENTS

In accordance with the present invention, a multielectrode photoelectrochemical cell useful, for example, for unassisted photolytically induced decompositions such as water splitting to form $H_2$ and $O_2$, is provided. This photoelectrochemical cell involves a photoelectrochemical unit which comprises a housing with housing walls and two ends defining an internal section. For a particularly preferred embodiment, contained in the housing are at least two photoactive bipolar electrode panels mounted across the internal section to form a multielectrode series array.

Each photoactive bipolar electrode panel has a semiconductor side and a catalytic side or underside. The photoactive bipolar electrode panels are situated in the housing and aligned so that their semiconductor sides face the same general direction. The bipolar electrode panels divide the volume enclosed by the housing into compartments. Internal compartments are located in the internal housing section between the two exterior bipolar electrode panels and terminal compartments border the internal faces of each exterior bipolar electrode panel.

The housing is at least partially constructed of material which allows irradiation of the semiconductor sides of the photoactive bipolar electrode panels mounted therein by a source of light external to the housing. The interior compartments have a port and are capable of retaining a first electrolyte. The first electrolyte is preferably oxygen-saturated. An oxygen-rich gas may also be retained within the interior compartments to assure maintenance of an $O_2$-saturated first electrolyte. Each of the two terminal compartments comprises a port for liquid access and may have a means for gas collection. Each interior compartment has a closable port which is an orifice in the housing wall. The port may be used to add liquid or gas to the compartment. For photoelectrochemical operation, the interior compartments of the photoelectrochemical unit are at least partially filled with oxygen-saturated first electrolyte. An oxygen-rich gas may be introduced into each interior compartment to assure oxygen saturation of the first electrolyte.

To produce a photoelectrochemical cell, the photoelectrochemical unit containing a first electrolyte in one or more interior compartments is immersed in a bath containing a second electrolyte. The second electrolyte, upon entering the ports of the terminal compartments, forms an electrolytic bridge between externally-facing sides of the two exterior bipolar electrode panels of the unit. The externally-facing sides of the exterior bipolar electrode panels each define a housing wall of one of the two terminal compartments. These terminal compartments are otherwise defined by the housing and have ports allowing access of an external second electrolyte and means for collecting evolving gases. When the photoelectrochemical cell is irradiated with light absorbable by photoactive bipolar electrode panel semiconductor sides, $O_2$ is produced at the externally-facing side of the exterior bipolar electrode panel of one terminal compartment and $H_2$ is produced at the externally-facing side of the exterior bipolar electrode panel of the other terminal compartment. The evolving $O_2$ and $H_2$ may be collected by the gas collection means such as storage containers or by any of numerous other means well-known to those skilled in the relevant arts.

In accordance with the present invention, a method for unassisted photodecompositions such as the photolytic splitting of water to form $H_2$ and $O_2$ based on a multielectrode photoelectrochemical cell is provided. This method involves use of the above-described photoelectrochemical cell in the manner indicated.

An object of the present invention is to provide a wireless multielectrode photoelectrochemical cell for unassisted photolytic water splitting to form $H_2$ and $O_2$ based on an electrolytic bias provided by interior photoactive bipolar electrode panels in contact with an $O_2$-saturated electrolyte solution.

One advantage of the photoelectrochemical cell of the present invention is that an expenditure of energy in addition to incident radiant (e.g., solar) energy is not required for photolytic water splitting. The photoelectrochemical cell of the present invention is simple in construction, involves no electrical wiring between bipolar electrode panels, and allows a ready collection of product gases such as $H_2$ and $O_2$ for various uses. Other photoelectrochemical devices having the same general purpose fail to demonstrate these advantageous properties.

DESCRIPTION OF THE PREFERRED EMBODIMENTS

The invention will be described in terms of preferred embodiments which represent the best mode known to the applicants at the time of this application.

FIG. 1 shows a multielectrode photoelectrochemical unit 10 according to a preferred embodiment of the present invention. In accordance with such preferred embodiment, multielectrode photoelectrochemical unit 10 comprises a housing 12 a first bipolar electrode panel 14 and a second bipolar electrode panel 16. It is contemplated that two bipolar electrode panels is the minimum workable number for the purposes of the present invention.

The housing 12 comprises a first end 18, a second end 20 and a housing wall 22. The housing wall 22 and ends 18, 20 define the internal section 24 of the housing 12. A particularly preferred housing usable in connection with the present invention is a length of corrosion-resistant tubing which comprises a transparent material such as temperature-resistant glass. The housing 12 has at least one light-passing or transparent side 26.

Each bipolar electrode panel 14, 16 comprises a semiconductor side 32, 33 a catalytic side 34 or an underside 36 and an ohmic contact layer 38. The bipolar electrode panels 14, 16 are mounted within the housing 12 and are attached at their edges 40 to the inside surface 42 of the housing wall 22 to partially define an internal compartment 44, a first terminal compartment 46 and a second terminal compartment 48. The semiconductor side 32 of the first bipolar electrode panel 14 and a portion 50 of the internal surface 42 of the housing wall 22 define the first terminal compartment 46 at the first end 18 of the housing 12. A second terminal compartment 48 at the second end 20 of the housing 12 is defined by the catalytic side 34 of the second bipolar electrode panel 16 and a portion 51 of the inside surface 42 of the housing wall 22. An internal compartment 44 is defined by the underside 36 of the first bipolar electrode panel 14, the semiconductor side 33 of the second bipolar electrode panel 16 and a portion 52 of the inside surface 42 of the housing wall 22.

The bipolar electrode panels 14, 16 are mounted within the housing 12 of the multielectrode photoelectrochemical unit 10. The mounting of these bipolar electrode panels 14, 16 is preferably so that the semiconductor side 32, 33 of each is oriented facing the same general direction and at a suitable angle to facilitate reception thereon of light from a source of light external to the multielectrode photoelectrochemical unit 10, particularly through the substantially transparent or light-passing side 26 of the housing 12. The bipolar electrode panels 14, 16 are mounted to substantially prevent a flow of liquid directly between the compartments 44, 46, 48.

In one embodiment of the present invention the bipolar electrode panels 14, 16 may comprise a polycrystalline titanium dioxide ($TiO_2$) film on the semiconductor side 32, 33 a platinum (Pt) metallic film on the catalytic side 34 and underside 36 and a titanium (Ti) ohmic contact layer 38 between the semiconductor side 32 and the catalytic side 34 or underside 36. Other bipolar electrode panels comprising other semiconductor films, such as $n-SrTiO_3$, $n-KTaO_3$, and $KTa_{0.77}Nb_{0.23}O_3$; other metallic films such as $RuO_2$, Ni and CoS; as well as other ohmic contact layers such as C, Brass and stainless steel may be used in various combinations known to those skilled in the relevant art to produce an effective photoelectrochemical cell of the present invention capable of unassisted water photolysis or other photolytically-induced chemical reactions.

The bipolar electrode panels 14, 16 should be mounted in the housing 12 at an interval, for example of at least about 4 cm, with both semiconductor sides 32, 33 oriented facing in the same general direction and at a suitable angle, for example of about 45 degrees, such that the semiconductor sides 32, 33 are substantially incident to light incoming from, for example, the light-passing side 26 of the housing 12. The internal compartment 44 is adapted to contain an electrolyte, the internal compartment 44 having a filling port 54 through which a quantity of electrolyte may be added. When the semiconductor is an oxide the electrolyte is preferably an oxygen-saturated alkaline solution and should be added to the internal compartment 44 until the sides of the bipolar electrode panels 14, 16 partially defining the internal compartment 44 are substantially covered by the electrolyte. A quantity of oxygen-rich gas may also be introduced through the filling port 54 into the internal compartment 44. The internal compartment 44 may then be closed by sealing the filling port 54.

The terminal compartments 46, 48 each have a liquid access port 56, 58. At least one terminal compartment 46, 48 also has a means for collecting gaseous photodecomposition products. This means for collecting may comprise a gas port 62, 64. The liquid access ports 56, 58 and the gas ports 62, 64 are orifices in portions 50, 51 of the housing wall 22, which, along with the first bipolar electrode panel 14 and second bipolar electrode panel 16, partially define the first terminal compartment 46 and the second terminal compartment 48 respectively.

To describe a water photolysis operation according to an embodiment of the present invention, an electrolyte is added through the filling port 54 of the internal compartment 44 to a suitable level substantially covering the sides 33, 36 of the bipolar electrodes 14,16. In one embodiment, an oxygen-rich gas is added above the electrolyte so that an $O_2$-saturated is maintained or formed in the internal compartment 44 of the multielectrode photoelectrode unit 10. The gas-electrolyte meniscus formed on the side 36 allows the sustaining of higher currents by effecting more efficient transport of $O_2$ to the Pt surface. The multielectrode photoelectrochemical unit 10 containing the electrolyte in the internal compartment 44 is then immersed in a second electrolyte, contained, for example, in a tank or bath. The second electrolyte enters the liquid access ports 56, 58 so that an electrolyte or salt bridge is formed between the semiconductor side 32 of the first bipolar electrode 14 and the catalytic side 34 of the second bipolar electrode 16. A particularly preferred second electrolyte used in connection with one embodiment of the present invention is an alkaline aqueous solution such as one comprising potassium hydroxide (KOH). Particularly preferred is a KOH solution having a concentration of about 1M. Upon irradiation from an external source of light hydrogen and oxygen form at the externally-facing sides 32, 34 of the first and second bipolar electrodes 14, 16 respectively. These gases may be collected through, for example, the gas ports 62, 64 of the terminal compartments 46, 48.

FIG. 2 shows a multielectrode photoelectrochemical unit 80 according to a second preferred embodiment of the present invention comprising multiple internal compartments. In accordance with such preferred embodiment, the multielectrode photoelectrochemical unit 80 comprises a housing 82 a first exterior bipolar electrode panel 84, three interior bipolar electrode panels 86, 88, 90 and a second exterior bipolar electrode panel 92. Although this embodiment uses five bipolar electrode panels, this particular number is not critical.

The housing 82 comprises a first end 94, a second end 96 and a housing wall 98. The housing wall 98 and ends 94, 96 define the internal section 100 of the housing 82. The housing 82 has at least one light-passing or transparent side 102. A particularly preferred housing 82 usable in connection with this embodiment of the present invention is a length of corrosion-resistant tubing which comprises a transparent material such as temperature-resistant glass. The housing 82 has a first liquid access port 104 at the first end 94 and a second liquid access port 106 at the second end 96.

The first exterior bipolar electrode panel 84 preferably comprises a catalytic side 108, an ohmic contact layer 110 and an underside 112. Each interior bipolar electrode panel 86, 88, 90 comprises a semiconductor side 114, 116, 118, an underside 120, 122, 124 and an ohmic contact layer 126, 128, 130. The bipolar electrode panels 84, 86, 88, 90, 92 are mounted within the housing 82 and are attached at their edges 122 to the inner surface 134 of the housing 82 wall 98 to partially define six compartments 136, 138, 140, 142, 144, 146. The catalytic side 108 of the first exterior bipolar electrode panel 84 and a portion 148 of the inner surface 134 of the housing wall 98 partially define the first terminal compartment 136 at the first end 94 of the housing 82. A second terminal compartment 146 at the second end 96 of the housing 82 is partially defined by the catalytic side 109 of the second exterior bipolar electrode panel 92 and a portion 152 of the inner surface 134 of the housing 82 wall 98.

A first internal compartment 138 is partially defined by the underside 112 of the first exterior bipolar electrode panel 84, the semiconductor side 114 of the first interior bipolar electrode panel 86 and a portion 154 of the inner surface 134 of the housing 82 wall 98. The second internal compartment 140 is partially defined by the underside 120 of the first interior bipolar electrode panel 86, the semiconductor side 116 of the second interior bipolar electrode panel 88 and a portion 156 of the inner surface 134 of the housing 82 wall 98. The third internal compartment 142 is partially defined by the underside 122 of the second interior bipolar electrode panel 88, the semiconductor side 118 of the third interior bipolar electrode panel 90 and a portion 158 of the inner surface 134 of the housing 82 wall 98. The fourth internal compartment 144 is partially defined by the underside 124 of the third interior bipolar electrode panel 90, the semiconductor side 119 of the second exterior bipolar electrode panel 92 and a portion 160 of the inner surface 134 of the housing 82 wall 98. The second terminal compartment 146 is partially defined by the catalytic side 109 of the second exterior bipolar electrode panel 92 and a portion 162 of the inner surface 134 of the housing 82 wall 98.

The bipolar electrode panels 84, 86, 88 90, 92 are mounted within the housing 82 of the multielectrode photoelectrochemical unit 80. The mounting of these bipolar electrode panels 84, 86, 88, 90, 92 is preferably so that each semiconductor side 114, 116, 118, 119 is oriented facing in the same general direction and at a suitable angle to facilitate reception thereon of light from a source of light external to the multielectrode photoelectrochemical unit 80. Light from the external source (not shown) penetrates the housing 82, preferably through a light-passing or transparent side 102. The bipolar electrode panels 84, 86, 88, 90, 92 are mounted to substantially prevent a direct flow of liquid between the compartments 136, 138, 140, 142, 144, 146.

Preferably used in connection with this embodiment of the present invention were semiconductor-containing bipolar electrode panels 86, 88, 90, 92 comprising a cadmium selenide (CdSe) film on semiconductor sides 114, 116, 118, 119. A platinum (Pt) film comprised the catalytic side 108, 109 of exterior bipolar electrodes 84, 92. A titanium (Ti) ohmic contact layer 110, 126, 128, 130, 111 comprised the innermost layer of all the bipolar electrode panels 84, 86, 88, 90, 92. Photosensitive bipolar electrode panels usable in the practice of the present invention may comprise semiconductor films, such as CdTe, CaAs, and $CdSe_xTe_y$. The catalytic sides 108, 109 of bipolar electrode panels of the present invention may comprise films of materials such as $RuO_2$, degeneratively doped CdX (X=S,Se,Te) or CoS; or metallic films such as Ni, Pt and platinized Ti. Ohmic contact layers 110, 126, 128, 130, 111, in addition to the titanium foil described herein may be of materials such as C, Brass and stainless steel which may be used in various combinations known to those skilled in the relevant art. The undersides 112, 120, 122, 124 of bipolar electrode panels 84, 86, 88, 90 should be chemically compatible with the semiconductor sides 114, 116, 118, 119 being used (such as the cobalt sulfide undersides and the cadmium sulfide semiconductor sides of the example presented herein) to produce an effective photoelectrochemical cell of the present invention capable of unassisted water photolysis.

The photosensitive bipolar electrode panels 86, 88, 90, 92 may be mounted in the housing 82 at intervals, for example of about 4 cm , with all semiconductor sides 114, 116, 118, 119 oriented in the same general direction and at a suitable angle, for example of about 45 degrees, such that the semiconductor sides 114, 116, 118, 119 are substantially incident to light from an external source directed into the internal section 100 through a light passing side 102 of the housing 82. The bipolar electrode panels 84, 86, 88, 90, 92 separate the internal section 100 of the housing 82 into compartments 136, 138, 140, 142, 444, 146 as described above. The internal compartments 138, 140, 142, 144 are adapted to contain a first electrolyte 150 which may be $O_2$-saturated or contain a polysulfide, depending upon the desired compatibility with the semiconductor system being used.

Each internal compartment 138, 140, 142, 144, has a filling port 164, 166, 168, 170 through which a quantity of first electrolyte 150 may be introduced, supplemented or extracted. Each filling port 164, 166, 168, 170 is characterized as being a closable orifice opening through a portion 154, 156, 158, 160 of the inner surface 134 of the housing 82.

A first electrolyte 150 compatible with the semiconductor being utilized is added to the internal compartments 138, 140, 142, 144 until the sides of the bipolar electrode panels 84, 86, 88, 90, 92 partially defining the internal compartments are at least substantially covered by the first electrolyte 150. A quantity of oxygen-rich gas may, if desired, also be introduced through the upper filling ports 164, 166, 168, 170 into the internal compartments. The internal compartments 138, 140, 142, 144 are then closed by sealing the filling ports 164, 166, 168, 170, for example, with rubber stoppers (not shown).

The terminal compartments 136, 146 each have a liquid access port 104, 106 through an adjacent portion 152, 162 of the inner surface 134 of the housing 82 and at least one also has a means for collecting gaseous photodecomposition products. Such means generally involve a gas port 176, 178 through an adjacent portion 152, 162 of the inner surface 134 of the housing 82 as shown in FIG. 2. The gas ports 176, 178 may be used for an active or passive transport and collection of generated gases.

To describe a water photolysis operation according to the present invention, a first electrolyte 150 is added through a filling port 164, 166, 168, 170 of each internal compartment 138, 140, 142, 144 to a suitable level and, depending upon the semiconductors being used, a polysulfide supplement or an oxygen-rich gas may be added above the first electrolyte 150, in the latter case so that the $O_2$-saturated first electrolyte 150 is maintained or formed in the internal compartments 138, 140, 142, 144 of the multielectrode photoelectro chemical unit 80. The multielectrode photoelectro chemical unit 80 containing the first electrolyte 150 is then immersed in a second electrolyte 180, contained, for example, in a tank or bath 182. A preferred second electrolyte 180 used in connection with present invention is an alkaline aqueous solution such as one comprising potassium hydroxide (KOH). Particularly preferred is a KOH solution having a concentration of about 1M. The immersion of the multielectrode photoelectrode unit 80 in the second electrolyte 180 is such that the second electrolyte 180 enters the liquid access ports 104, 106 in the terminal compartments 136, 146 and enters the terminal compartments 136, 146 to substantially cover the catalytic sides 108, 109 of the external bipolar electrode panels 84, 92 bordering the first terminal compartment 136 and the second terminal compartment 146. The second electrolyte 180 forms an electrolyte bridge (not shown) between the terminal compartments 136, 146 and thus further completes a photoelectrochemical cell 190 of the present invention.

FIG. 2 shows a multielectrode photoelectrochemical cell 190 of the present invention which comprises a multielectrode photoelectrode unit 80 containing a first electrolyte 150 within the internal compartments 138, 140, 142, 144. The multielectrode photoelectrochemical cell 190 further includes an electrolyte bridge formed, in this case, by a volume of second electrolyte 180 contained in a bath 182.

The multielectrode photoelectrochemical cell 190 was irradiated with a visible or ultraviolet light. The irradiation was from an external source and through the light-passing side 102 of the housing 82 and the light was substantially incident upon the semiconductor sides 114, 116, 118, 119 of the bipolar electrode panels covered by the first electrolyte 150. The photoelectrochemical effect resulted in the generation of hydrogen and oxygen.

Oxygen formed in the second electrolyte 180 at the catalytic side 108 of the first exterior bipolar electrode panel 84 in the first terminal compartment 136. Hydrogen formed at the catalytic side 109 of the second exterior bipolar electrode panel 92 in the second terminal compartment 146. One preferred convenient usage in connection with the present invention is for the first electrolyte 150 and the second electrolyte 180 to be the same, most preferably comprising of an aqueous solution of alkali, such as a KOH solution having a concentration of about 1M.

In accordance with such preferred embodiments, the multielectrode photoelectrochemical cell 190 may include means for the capture of generated gases. Such means are schematically not shown in FIG. 2 but may comprise vessels in communication with the gas ports 176, 178. The electrolytic bath 182 about the multielectrode photoelectrochemical unit 80 may include means such as slots (not shown) for mounting the multielectrode photoelectrochemical unit 80 in a secure position during immersion in the second electrolyte 180 and usage for gas generation.

According to one preferred embodiment of the invention, a sufficient driving force for $H_2$ and $O_2$ formation may be attained by utilizing interior bipolar electrode panels in an $O_2$ saturated first electrolyte 150 to provide an electrolytic bias. The following formula illustrates the basic working principle of present invention.

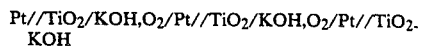

It is important, when using this $TiO_2$ semiconductor-based system, to maintain an oxygen atmosphere above the first electrolyte 150 which is contained in each internal compartment 138, 140, 142, 144 of the multielectrode photochemical unit 80 and to maintain an electrolytic bridge between the two exterior bipolar electrode panels 84, 92.

In order that the invention may be more clearly understood, preferred embodiments will be further described in terms of the following examples, which should not be construed to limit the scope of this invention further than the claims appended hereto.

EXAMPLE I

Bipolar $TiO_2$/Pt Semiconductor Photoelectrodes and Multielectrode Arrays for Unassisted Photolytic Water Splitting Bipolar $TiO_2$/Pt photoelectrodes were fabricated by anodization of thin Ti foils onto which Pt had been previously sputter-deposited. These photoelectrodes are capable of a vectorial charge transfer. Current-potential curves were used to predict the behavior of multielectrode arrays. Several different multielectrode cells, utilizing $KOH/O_2$ electrolytes, were constructed. In series configuration, the open circuit voltage $V^{oc}$ in excess of 3.6V is obtained, permitting unassisted photolytic (Xe lamp) water splitting to produce $H_2$ and $O_2$.

Connecting several photoactive junctions in series will generate a sufficient driving force to decompose $H_2O$ to $H_2$ and $O_2$ without external bias. (White et al., J. Electrochem. Soc. (1985), V. $13^2$, pp. 544). This embodiment of the present invention involves the construction of bipolar electrodes consisting of a polycrystalline film of $TiO_2$ formed by spark anodization of Ti with a sputtered Pt backing (denoted $TiO_2$//Pt) and the series assembly of these into multipanel arrays that split water when irradiated with a Xenon lamp.

Figure 3A:
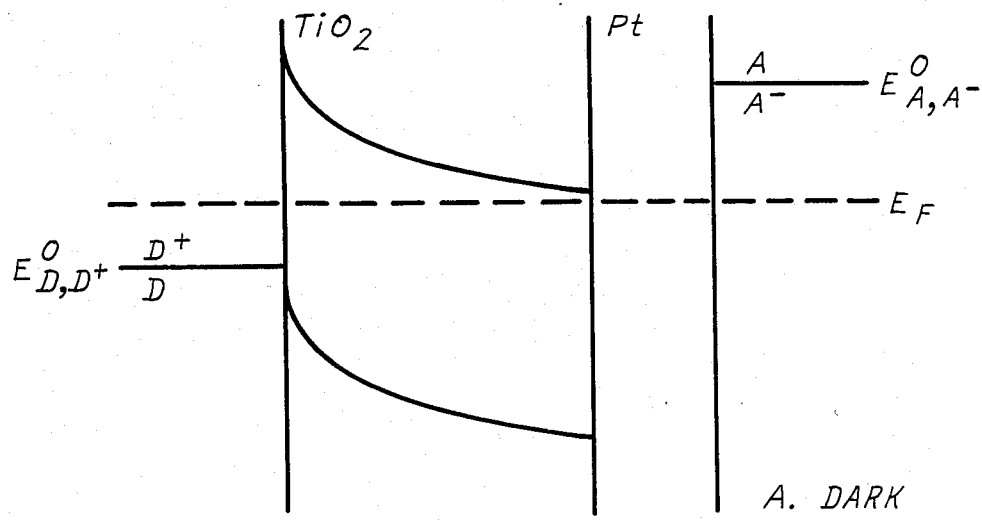
FIG. 3 shows a schematic representation of $TiO_2//Pt$ bipolar electrode in contact with solutions containing the $D^+,D$ and $A,A^-$ couples (A) in the dark at equilibrium and (B) under irradiation.
Figure 3B:
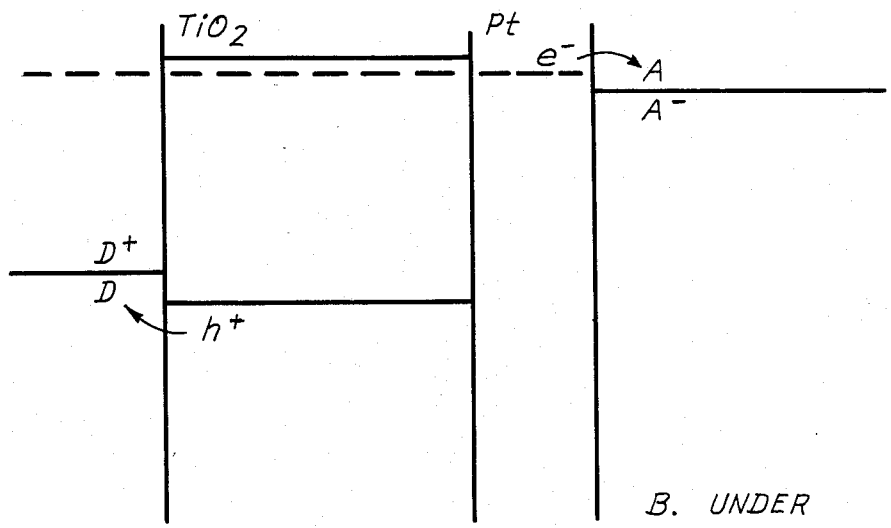

The bipolar electrodes of the present invention described in this example utilized polycrystalline $Tio_2$ Electrochem. Soc. (1976), V 123, pp 1027; and Takahashi, J. Chem. Soc., (F.T.I.) (1981), V 77, pp. 1051), thermal oxidation (Hartig, et al., Int. J. Hydrogen Energy, (1983), V 8, pp. 603; and Matsumoto, Electrochim. Acta, (1982), V 27, pp. 419), anodic oxidation (Miller, Chem. Phys. Lett., (1983), V. 100, p 236; and Getoff, Solar Energy Materials (1983), V. 9, p 167), RF sputtering (Lokshmanan et al., IEEE Comp. Parts, (1964), CP-11(2)14), and sol-gel methods (Yoko et al., Book of Abstracts, Fifth International Conference on Photochemical Conversion and Storage of Solar Energy, Osaka, Japan (1985); Abstract B15(6) have been reported. The anodic oxidation approach was utilized for the present bipolar electrode construction because such films were readily and reproducibly produced on thin Ti foils faced with sputtered Pt films. Such bipolar $TiO_2$//Pt electrodes (where // represents an ohmic contact) were capable of vectorial charge transfer, with photogenerated holes ($h_+$) moving to the $TiO_2$ interface to cause an oxidation, and the electrons ($e^-$) moving to the Pt interface to carry out a reduction. The energetics of such a bipolar electrode follow directly from the well-established principles of PEC cells (Bard, Science, (1980), V. 207, p. 139) as shown schematically in FIG. 3. The analysis of the electrochemical behavior of a single bipolar electrode for actual redox couples and of series connected multijunction cells can be carried out by graphical addition of current-potential (i-V curves (White et al., cited above), as described below.

Photosensitive $TiO_2$ films were prepared by the high-voltage anodization technique reported by Marchenoir et al., (Thin Solid Films (1980), V. 66, p. 357) and Miller (Chem. Phys. Lett. (1983), V. 100, p. 236). The Ti foil, purchased from Johnson Matthey, Inc., had a thickness of 0.025 mm and a purity of 99.7%. The Ti foil was degreased in methylene chloride and rinsed in distilled water. One side of the foil was coated with a Pt film ca. 350 nm thick by RF sputtering with a Materials Research Co., (Orangeburg, NY) model 8620 sputtering apparatus at $2 \times 10^{-2}$ torr Ar with a deposition rate of 10 Å/s. The platinized foil was cut into $3 \times 3$ cm squares and the Ti side was subjected to spark anodization in the cell shown in FIG. 4. Sulfuric acid (2.5M) was used as the electrolyte facing the Ti side with a platinized titanium foil serving as the cathode. Side B, facing the Pt, was filled with ice water to cool the electrode during the anodization. The Ti foil, which served as the anode, was glued between the cells with silicone cement. The voltage between the Ti foils was gradually increased with the current density never exceeding 35 mA/cm². Sparking began at 95V and continued up to the final applied voltage, 125V; at this point the electrolyte was replaced and the final voltage maintained for 10 min. The anodized foil, with a $TiO_2$ film thickness of 2 um, was rinsed in boiling distilled water before use. The thickness of $TiO_2$ films formed on anodization depended upon the applied voltage (Mizushima, J Electrochem. Soc. (1961), V. 108, p. 825); thicknesses of anodized films were estimated from scanning electron micrographs.

Voltammograms were recorded with a Princeton Applied Research (PAR) model 173 potentiostat/galvanostat, a PAR model 175 universal programmer, and a Houston Instruments model 2000 X-Y recorder. The illumination source was a 2500 watt xenon lamp from which infrared wavelengths were removed by an 8 in. water filter. The photon flux, measured with a Fluka Model 8060 A multimeter. All chemicals were reagent grade and were used without further purification.

Power characteristics of he PEC cells were evaluated by employing the potentiostat as a variable load; the counter and reference electrode leads of the PAR were connected to a platinum electrode, and the illuminated $TiO_2$ electrode was connected to the working electrode lead. The applied potential was then decreased from zero volts (to yield the short circuit current, $i_{sc}$) until the current ceased (to yield the open circuit photovoltage, $V_{oc}$).

The cell for multipanel series configurations, shown in FIG. 5, was constructed from a Pyrex tube (15 mm) cut at 4 cm intervals at 45 degree angles. Each segment had a filling port through which electrolyte could be added. The electrodes were glued between the segments with epoxy (Ring Chemical Co., Houston, Tex.) with all of the platinum sides facing in the same direction.

The five panel water photoelectrolysis system is shown in FIG. 6. The end cells were filled by complete immersion of the cell into a 1M KOH bath. The interior cells were then filled to desired levels through the ports. An oxygen atmosphere was maintained above the electrolyte in the interior cells. The gas collecting tubes on the end cells were calibrated to permit monitoring of gas volume with time. The evolution of hydrogen and oxygen was confirmed by gas chromatographic analysis using a column packed with 50 g of 13X, 60/80 mesh, sieves from Alltech Associates Inc., with argon as the carrier gas at 30 mL/min.

Photoelectrochemical Behavior of single $TiO_2$//Pt Panels. The $TiO_2$ films formed by anodization were about 2 um thick with pore diameters of about 1000 Å. X-ray diffraction measurements showed powder patterns characteristic of both rutile and anatase phases as well as $Ti_2O_3$, TiO, add Ti metal, suggesting a gradient of oxides with the lower oxides nearer the Ti surface. One form of bipolar electrode consisted of a free-standing $TiO_2$ file produced by spark anodizing the Ti foil to form a $TiO_2$ film, RF sputtering of Pt onto the $TiO_2$, and dissolving the remaining Ti substrate in methanol containing 20% $Br_2$. The resulting $TiO_2$/Pt film was handled with Nylon mesh. However, it was easier to platinize the Ti before anodization of the opposite side, and this configuration was used in all of the experiments of this Example described below.

Figure 8:
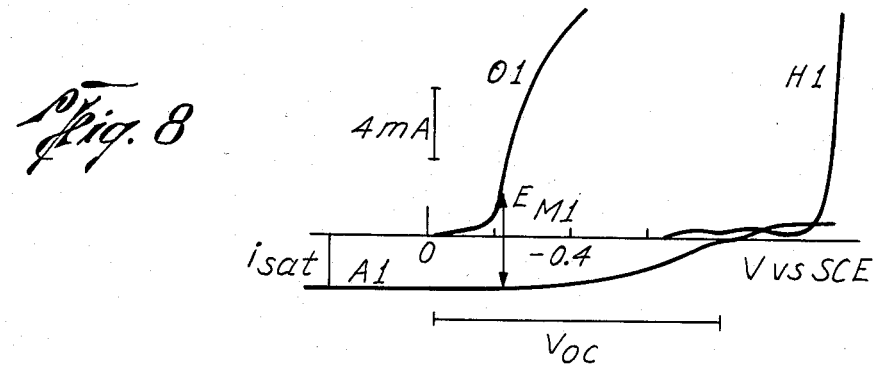
FIG. 8 shows current-potential curves for irradiated $TiO_2$/KOH (A1); Pt/KOH, $O_2$ (01); Pt/KOH (deaerated) (H1).
Figure 9A:
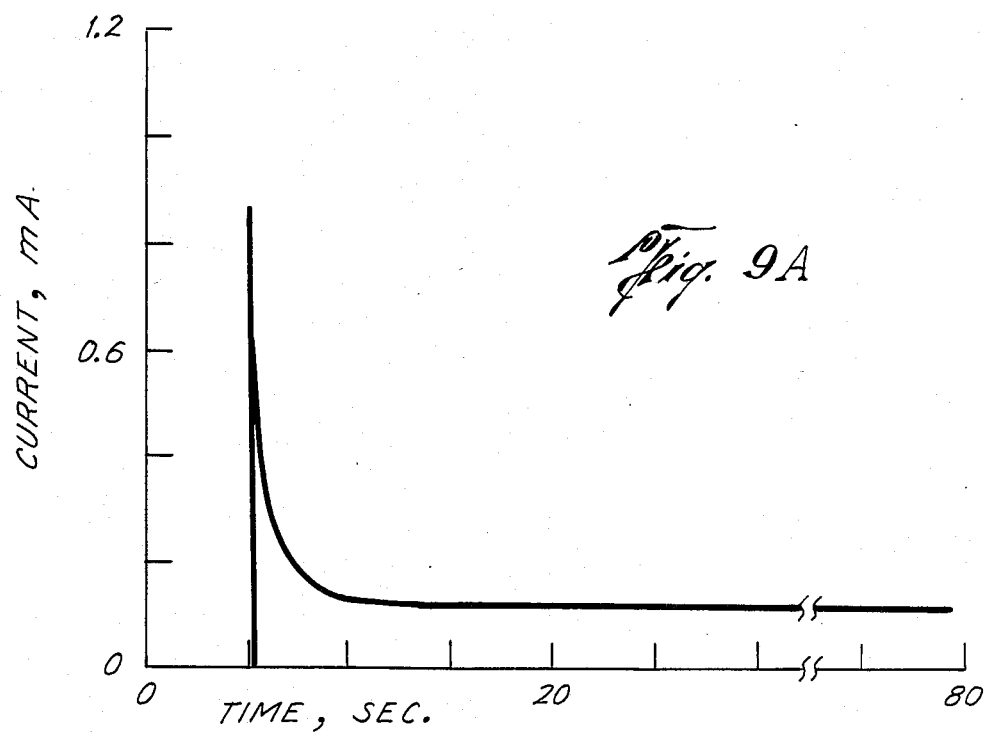
FIG. 9 shows current vs. time profiles for illuminated $TiO_2$ surface (5.7 cm$^2$) with counterelectrode in 1 M KOH. A. Counterelectrode completely immersed. B. Counterelectrode partially immersed.
Figure 9B:
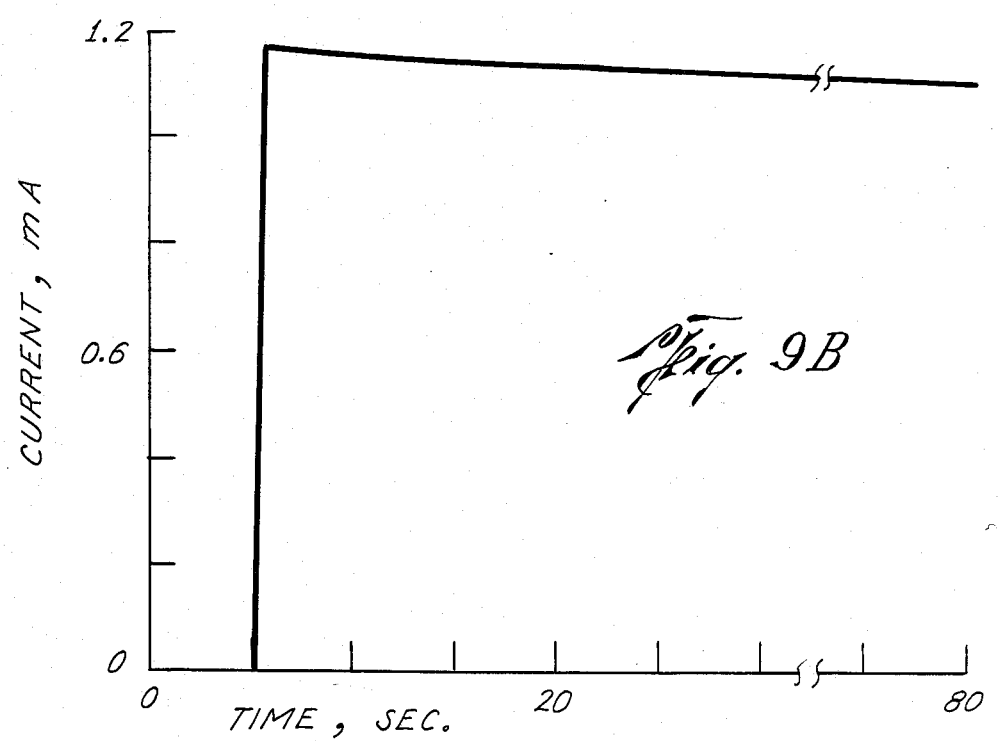

The photoelectrochemical behavior of the bipolar panel was elucidated by studying the i-V characteristics of each side independently. For this purpose the panel was clamped between two solutions in the configuration of FIG. 2. The resulting i-V curves for the interfaces $TiO_2^*$/KOH (A1); Pt/KOH, $O_2$ (01); and Pt/KOH (H1, deaerated with Ar) are shown in FIG. 8 (where * indicates an irradiated interface). These are typical curves for photogeneration of $O_2$ on $TiO_2$, the reduction of $O_2$ on Pt, and the reduction of $H_2O$ on Pt to produce $H_2$, respectively. The current-time behavior at the Pt/KOH, $O_2$ interface strongly depended upon the way the interface was established, as seen previously in PEC cells (Mizushima, J. Electrochem. Soc. (1961), V 108, p 825). When the entire Pt electrode was immersed in the $O_2$-saturated solution, the current quickly decayed with time as the low initial concentration of $O_2$ near the electrode was depleted (FIG. 9A). Higher currents could be sustained by partial immersion of the Pt side and allowing gaseous $O_2$ to diffuse through the thin electrolyte solution meniscus; this resulted in more effective transport of $O_2$ to the electrode (FIG. 9B). This configuration was used in the PEC cells, since in this form currents were limited by the incident radiation intensity rather than by the $O_2$ mass transfer rate in solution. These results demonstrate the importance in designing both interfaces of the bipolar electrode to maximize the photocurrent.

Multielectrode $O_2/OH^-$ cells. To demonstrate vectorial charge transfer at a panel, the cell compartments on either side of the bipolar film shown in FIG. 2 were equipped with two large Pt foil electrodes and were each filled with $O_2$-saturated KOH, i.e.;

+Pt/KOH,$O_2$/*$TiO_2$//Pt/KOH,$O_2$/Pt-

Upon irradiation of the $TiO_2$ side of the bipolar electrode, an open circuit photovoltage of 0.81V and a short circuit current of 0.4 mA was produced between the immersed Pt foils. This short circuit current does not represent the maximum current attainable at a single bipolar electrode, since Pt electrodes (found at each end of this assembly) show overpotentials for the $O_2$-evolution and $O_2$-reduction reactions (in addition to iR drop through the solution). The maximum bipolar electrode current can be estimated by consideration of the A1 and O1 i-V curves in FIG. 8. The short-circuit photocurrent, $i_{sc}$, occurs where the cathodic and photoanodic currents are equal (as indicated in FIG. 8 at the mixed potential, $E_{M1}$). The open circuit photovoltage ($V_{oc}=0.82V$) is obtained as the potential difference when both currents are zero.

Figure 10:
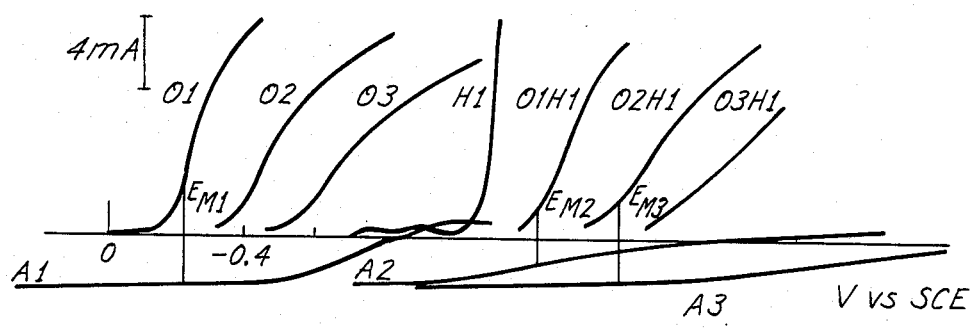
FIG. 10 shows current-potential characteristics of $TiO_2//Pt$ panels in 1M KOH.

The predicted I-V curves for panels in series (FIG. 5) are given in FIG. 10. These can be obtained by independent graphical addition of the cathodic curves by summing the potentials at constant current (since the electrodes are connected in series) and, treating in the same way, the anodic ones. The result of this procedure, in consideration of a two panel cell with both Pt cathodes immersed in $O_2$-saturated KOH, is shown in FIG. 10 as curves A2 and O2. The power curves for the multiple panels in series were obtained using the cell in FIG. 5. Three panels were used with two intervening electrolyte solutions:

$$Pt//TiO_2*//KOH,O_2/Pt//TiO_2*/KOH,O_2/Pt$$

The experimental results are shown in FIG. 11. The behavior of cells with 4 and 5 panels can be deduced in a similar way from the i-V curves; those for three active panels are shown as curves O3 and A3 in FIG. 11. The experimental results for 1 through 4-panel PEC cells are shown in Table 1. As expected the $V_{oc}$ of the cells are additive and the $i_{sc}$-values are constant (within the small variability among the panels). Thus the efficiency of the overall cell is independent of the number of panels (Table 1).

TABLE 1

| | Power Characteristics | | | |
|---|---|---|---|---|
| | Number of Panels | | | |
| | 1 | 2 | 3 | 4 |
| Fill factor (ff) | 0.46 | 0.41 | 0.38 | 0.44 |
| $V_{oc}$ (V) | 0.73 | 1.5 | 2.3 | 3.1 |
| $i_{sc}$ (mA) | 0.45 | 0.6 | 0.56 | 0.5 |
| Overall efficiency (%) | 0.057 | 0.069 | 0.061 | 0.064 |

*Calculated by ff × $V_{oc}$ $i_{sc}$/PAn, where P is flux, A is area of panel, and n is the number of panels. Photon flux (P), Xenon lamp = 266 mW/cm², exposed area - 1 cm².

Water photoelectrolysis cell. The individual i-V curves for $TiO_2$/KOH (A1) and Pt/KOH (deaerated) (H1) when combined clearly show that a single panel cannot drive the water splitting reaction. However, by utilizing interior panels in $O_2$-saturated solution to provide a bias, a sufficient driving force for $H_2$ and $O_2$ production can be attained. Consider the two panel cell:

$$KOH[1](deaer.)/Pt//TiO_2*/KOH[2]O_2*/Pt//TiO_2*,KOH[3]$$

where the two ends of the cell (KOH solutions [1] and [3] are connected by a KOH salt bridge. The predicted behavior of this cell can be derived from addition of 1 A1 curves (to yield A2) and the addition of O1 to H1 to yield O1H1 and H1 (FIG. 10). The rate of $H_2$ and $O_2$ evolution can be estimated from the power curve derived by addition of these. The characteristics of a three panel cell can similarly be derived by consideration of curves A3 and O2H1. Note that the predicted $i_{sc}$, but for the 3-panel cell $i_{sc}=0.85$ $i_{sat}$. A plot of $i_{sc}/i_{sat}$ vs. number of panels, shown in FIG. 10, suggests that for conversion of solar energy to $H_2$ and $O_2$, there is little to be gained in using a configuration with more than 3 panels. However, to test the operation of a multiple panel PEC cell for water splitting, a 5 panel cell, shown in FIG. 4, was illuminated for 5 h with a Xe lamp (266 mW/cm² incident). Gas evolution occurred at each end electrode, $H_2$ being evolved on the Pt extreme and $O_2$ at the TiO end. A volume of 0.52 mL of $H_2$ (identified by gas chromatography evolved and an $H_2/O_2$ molar ration of 2.4/1 was obtained.

Vectorial charge transfer on bielectrode panels has been demonstrated. Means have been established for coupling these panels to produce higher driving forces than those available from systems with single semiconductor electrodes for predicting the PEC characteristics from individual i-V curves. The unassisted photolytic water splitting reaction has been demonstrated. No effort was made in these studies to optimize the behavior of the PEC cells through improvement of the $TiO_2$ film, new interior redox couples, or better mass transport.

EXAMPLE 2

The present Example demonstrates the use of a small bandgap semiconductor, CdSe, for the unassisted photocomposition of water to yield the separated products hydrogen and oxygen in the stoichiometric ratio of 2:1, with a novel arrangement of bipolar semiconductor photoelectrodes. Direct water splitting in an n-type semiconductor photoelectrochemical (PEC) cell is usually thought to require a semiconductor that is stable under irradiation in aqueous solution and whose valence band is located at sufficiently low energies (positive potentials) that oxidation of water is thermodynamically and kinetically possible. Thus, n-$TiO_2$ and n-$SrTiO_3$ have been used. Fujishima et al. (Nature (London) 1972, V 238, p 37) chose $TiO_2$, although the large bandgaps ($\geq 3$ eV) greatly limits the solar efficiency of such PEC cells. Smaller bandgap semiconductors, such as metal chalcogenides, often under deleterious photoanodic decomposition when illuminated in solutions where direct oxidation of water is possible. For example, CdSe undergoes photodecomposition according to Eq. 1.

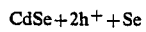

$$CdSe + 2h^+ + Se$$

and the photocurrent decays as an insulating layer of elemental selenium forms on the semiconductor surface. Metal chalcogenides, such as CdS and CdSe, can be stabilized by use of a polysulfide electrolyte. Ellis et al., J. Am. Chem. Soc., 1976, V 98, p 1635; and Hodes et al., Nature (London) 1976, V 261, p 403. In such systems, oxidation of sulfide ion prevents lattice oxidation. Thus, while a photovoltaic cell that employs a n-CdSe photoanode and suitable electrocatalytic cathode for polysulfide reduction (e.g., CoS, PbS, sulfurized brass) is capable of sustained electrical current generation, it cannot split water into hydrogen and oxygen in the presence of polysulfide.

Example 1 described the use of a series array of bipolar $TiO_2$/Pt photoelectrodes capable of vectorial electron transfer. These arrays permit unassisted photolytic water splitting with oxygen evolved at the semiconductor surface and hydrogen evolved on a platinum surface. As only u.v. light is absorbed by $TiO_2$, the system is of limited efficiency with normal solar flux. However, it is also possible to use an array of bipolar electrodes with smaller bandgap semiconductors, e.g., CdSe/CoS, with stable end electrodes (e.g., Pt) for production of $H_2$ and $O_2$. A schematic diagram of this system is shown in FIG. 13. The energetics of vectorial electron transfer at one bipolar photoelectrode are illustrated in the expanded view of the terminal photoelectrode, I/J, depicted in FIG. 13. The basic principles of PEC devices have been discussed in detail. The chemical reactions pertaining to each interface are

| A | Pt KOH (2 M) | $OH^- \, 1/4O_2 + \frac{1}{2}H_2O + e^-$ |
|---|---|---|
| B, D, F, H | CoS/KOH (1 M), S (1 M), Na$_2$S (1 M) | $\frac{1}{2}S_2^{2-} + e^- \, S^{2-}$ (dark) |
| C, E, G, I | CdSe/KOH (1 M), S (1 M) Na$_2$S (1 M) | $S^{2-} + h^+ \, \frac{1}{2}D_2^{2-}$ (light) |
| J | Pt/KOH (2 M) | $H_2O + e^- \, \frac{1}{2}H_2 + OH^-$ |

CdSe thin films for PECs have been prepared by spray pyrolysis, vacuum evaporation, electrodeposition, chemical bath deposition, and slurry painting (as described in Example 1). The bipolar electrodes used here were fabricated by the method of Hodes et al. (J. Electrochem. Soc. (1980) V. 127, p 2252), by painting a slurry of CdSe on a titanium foil (0.025 mm thick) annealing in air at 500° C. followed by photoannealing in 0.1M H$_2$SO$_4$. Annealing in the absence of oxygen resulted in panels with very poor open circuit voltages and short circuit currents. The beneficial effect of air annealing has been reported by others (Boudreau et al., J. Electrochem. Soc. (1986), V. 133, p. 1248). CoS was then electroplated on the back side of the titanium foil. The electrode (A,B) was made by sputter-depositing platinum on one side of titanium foil and electroplating CoS on the opposite side. The terminal photoelectrode (I,J) was made by painting and annealing a slurry of CdSe on titanium foil which had been previously sputter-deposited with Pt on the opposite side.

All CdSe semiconductors in the array were in contact with a stabilizing polysulfide solution and only the two terminal Pt electrodes contacted 2M KOH and were connected to each other by a KOH salt bridge. Oxygen was evolved at the Pt face of the Pt/CoS electrode while hydrogen was evolved at the Pt face of the CdSe/Pt electrode. The relevant current-potential (i-V) data for a CdSe/CoS panel are shown in FIG. 14. Curve A is the i-V characteristic for the dark reduction of polysulfide of the CoS electrodes. The photooxidation of sulfide on the semiconductor surface is shown on curve B. The open circuit voltage, $V_{oc}$, is 0.5V with a short circuit current, $i_{sc}$, indicated by the dotted line placed so that the magnitude of the anodic current (curve B) is equal in magnitude to the cathodic current (curve A) of 12 mA/cm$^2$.

The power characteristics of a six photoelectrode PEC array were evaluated by employing a Princeton applied Research (PAR) model 173 potentiostat/galvanostat with a PAR model 175 universal programmer as a variable load[3]. The potential of a CdSe surface under illumination with a xenon lamp, was adjusted from zero volts relative to a CoS electrode (to yield $i_{sc}$) to negative potentials, until the current ceased (to yield the $V_{oc}$). The results are shown in the inset of FIG. 14. As with the TiO$_2$ system, the open circuit photovoltages are additive, the sum of the series being in excess of 1.5V. At higher light fluxes the open circuit voltage of a single panel was in excess of 0.6V.

The fill factor, ff, for the series array was 0.57. The efficiency for electrical power generation measured for six photoelectrode panels calculated by Eq. 2 was 1.9%.

$$n_e = (V_{oc} \times i_{sc} 33 \, ff(/W_L \times N \times A)$$

where $W_L$ is the solar light flux incident on the cell, N is the number of photopanels (6) and A is the projected area of a panel (the light flux is directed 45° off the normal of the panels). If a correction is made for the absorption of light by the polysulfide solution, the efficiency is 5.3%. Hence, with the given quality of the panels used here, improvements can be made in the system efficiency up to 5.3%.

When the Pt faces were contacted by KOH and connected by a KOH bridge, as shown in FIG. 13, hydrogen and oxygen evolution occurred. The photovoltage of the illuminated CdSe photoelectrode array induces bipolarity in the dark electrode A/B. Water photolysis experiments were carried out for 1 h period without stirring. Upon illumination, bubbles immediately began streaming from the Pt surfaces. The identity of the gases evolved at the Pt cathode and anode, hydrogen and oxygen respectively, was verified by gas chromatography. After 1 h, the rate of bubble formation on the terminal Pt surfaces decreased. This may have been caused by pH gradients developing at the Pt/KOH interfaces. That degradation was not due to effects at the CdSe or CoS interfaces was verified by removing the KOH bridge and obtaining power curves for electrical generation. No decay was observed in the power curves, hence decreased gas evolution was attributed to phenomena in the terminal cells. Replacement of the solution bridge restored hydrogen evolution to the initial rate (>1 cm$^3$/h), supporting the above conclusion. The hydrogen to oxygen volume ratio obtained in this study was 2.1±0.3. The efficiency (calculated for light incident on the cell) for water photolysis, calculated by Eq. 3, was 0.32%.

$$n_H = (R \times G°)/W_L \times N \times A)$$

where R is the rate of hydrogen evolution (mol/s), and G° is the standard free energy change for the decomposition of water to hydrogen and oxygen (J/mol). If a correction is made for the light absorbed by the polysulfide solution, the efficiency was 0.91%. Further improvements can be made by using a better electrode with a lower overpotential for O$_2$ evolution then Pt (e.g., a nickel based electrode (Tidak et al., Comprehensive Treatise of Electrochemistry, Bockris, J. O'M., ed., Plenum Press: N.Y. (1981), pp. 13–33.) and by using smaller bandgap material either directly or as underlayers for larger bandgap materials in biphotonic tandem panels. (Weber, et al., J. Electrochem. Soc., (1984) 1331:1258).

Changes may be made in the construction, operation and arrangement of the various parts, elements, steps and procedures described herein without departing from the concept and scope of the invention as defined in the following claims.

What is claimed is:

1. A multielectrode photoelectrochemical unit for unassisted photoelectrical-induction of a chemical reaction comprising:

a housing having at least one light-passing side, a first end, a second end and a housing wall defining an internal section;

a first photoactive bipolar electrode panel in the internal section, said first photoactive bipolar electrode panel having a semiconductor side, an ohmic contact layer and a underside and being attached to the housing wall near the first end of said internal section with the semiconductor side oriented toward the first end and partially forming a first terminal compartment; and a second photoactive bipolar electrode panel in the internal section, said second photoactive bipolar electrode panel having a semiconductor side, an ohmic contact layer and a catalytic side and being attached to the housing wall near the second end of the internal section with the catalytic side oriented toward the second end and partially forming a second terminal compartment, an internal compartment in said internal section being partially formed by the underside of the first photoactive bipolar electrode panel and the semiconductor side of the second photoactive bipolar electrode panel, said first and second photoactive bipolar electrode panels being attached to said housing walls to prevent liquid flow between the internal compartment and the terminal compartments and being positioned so that light from an external source entering the internal section is substantially incident upon the semiconductor sides.

2. A multielectrode photoelectrochemical unit for unassisted photoelectrical-induction of a chemical reaction comprising:

a housing having at least one light-passing side, a first end, a second end and a housing wall defining an internal section;

a first photoactive bipolar electrode panel in the internal section, said first photoactive bipolar electrode panel having a semiconductor side, an ohmic contact layer and an underside and being attached to the inside of the housing wall near the first end of said internal section to physically separate the internal section on each side of the first photoactive bipolar electrode panel with the semiconductor side oriented toward the first end and partially forming a first terminal compartment; and a second photoactive bipolar electrode panel in the internal section, said second photoactive bipolar electrode panel having a semiconductor side, an ohmic contact layer and a catalytic side and being attached to the inside of the housing wall near the second end of the internal section to physically separate the internal section on each side of the second photoactive bipolar electrode panel with the catalytic side oriented toward the second end and partially forming a second terminal compartment, an internal compartment in said internal section formed by the housing wall, the underside of the first photoactive bipolar electrode panel and the semiconductor side of the second photoactive bipolar electrode panel, said first and second photoactive bipolar electrode panels being attached to said housing walls to prevent liquid flow between the internal compartment and the terminal compartments and being positioned so that light from an external source entering the internal section is substantially incident upon the semiconductor sides.

3. The multielectrode photoelectrochemical unit of claim 1 or 2 wherein the semiconductor side comprises a p-type semiconductor or a n-type semiconductor.

4. The multielectrode photoelectrochemical unit of claim 1 or 2 wherein the internal compartment comprises a closable port in the wall of the housing.

5. The multielectrode photoelectrochemical unit of claim 1 or 2 wherein at least one terminal compartment comprises a means for collecting a gaseous pnotodecomposition product.

6. The multielectrode photoelectrochemical unit of claim 1 or 2 wherein the catalytic side and underside comprise platinum, ruthenium dioxide or cobalt sulfide.

7. A multielectrode photoelectrochemical unit for unassisted photoelectrical-induction of a chemical reaction comprising:

a housing having at least one light-passing side, the housing having a first end, a second end and a housing wall defining an internal section;

a first exterior bipolar electrode panel attached to the housing wall near the first end of the internal section of the housing, said first exterior bipolar electrode panel having a gas-evolving side oriented toward the first end and partially forming a first terminal compartment, an ohmic contact layer and an underside;

a second exterior bipolar electrode panel attached to the housing wall near the second end of the housing said second bipolar electrode panel having a gas-evolving side oriented toward the second end and partially forming a second terminal compartment, an ohmic contact layer and a semiconductor side;

at least one interior bipolar electrode panel, said interior bipolar electrode panel having a semiconductor side, an ohmic contact layer and an underside and being attached to the housing wall in the internal section between the exterior bipolar electrode panels, said internal section being divided by internal and exterior bipolar electrode panels into at least two internal compartments; and means for collecting evolved gaseous photodecomposition products in at least one terminal compartment.

8. A multielectrode photoelectrochemical unit for unassisted photoelectrical-induction of a chemical reaction comprising:

a housing having at least one light-passing side, the housing having a first end, a second end and a housing wall defining an internal section;

a first exterior bipolar electrode panel attached to the inside of the housing wall near the first end of the internal section of the housing to physically separate the internal section on each side of the first exterior bipolar electrode panel, said first exterior bipolar electrode panel having a gas-evolving side oriented toward the first end and partially forming a first terminal compartment, an ohmic contact layer and an underside;

a second exterior bipolar electrode panel attached to the inside of the housing wall near the second end of the housing to physically separate the internal section on each side of the second exterior bipolar electrode panel, said second bipolar electrode panel having a gas-evolving side oriented toward the second end and partially forming a second terminal compartment, an ohmic contact layer and a semiconductor side;

at least one interior bipolar electrode panel, said interior bipolar electrode panel having a semiconductor side, an ohmic contact layer and an underside and being attached to the inside of the housing wall in the internal section between the exterior bipolar electrode panels, said internal section being divided by internal and exterior bipolar electrode panels into at least two internal compartments; and means for collecting gaseous photodecomposition products from at least one terminal compartment.

9. The multielectrode photoelectrochemical unit of claim 7 or 8 wherein the bipolar electrode panels having a semiconductor side are oriented so that light from an external source passing into the internal section is substantially incident upon a majority of the semiconductor sides.

10. The multielectrode photoelectrochemical unit of claim 7 or 8 wherein the gas-evolving side of the first exterior bipolar electrode panel and the gas-evolving side of the second exterior bipolar electrode panel are metallic.

11. The multielectrode photoelectrochemical unit of claim 7 or 8 wherein there are three interior bipolar electrode panels.

12. The multielectrode photoelectrochemical unit of claim 7 or 8 wherein the internal compartments are defined further as each having a housing wall and two ends, each end consisting of a side of a bipolar electrode panel.

13. The multielectrode photoelectrochemical unit of claim 7 or 8 wherein the internal compartments comprise closable filling ports usable for transfer of fluids to and from the compartments.

14. The multielectrode photoelectrochemical unit of claim 13 wherein the closable filling parts are sealed to isolate internal compartments during immersion of the multielectrode photoelectrochemical unit in an electrolyte bath.

15. The multielectrode photoelectrochemical unit of claim 7 or 8 wherein the semiconductor side comprises a p-type or n-type semiconductor.

16. The multielectrode photoelectrochemical unit of claim 7 or 8 wherein the semiconductor side comprises a metal chalcogenide.

17. The multielectrode photoelectrochemical unit of claim 7 or 8 wherein the semiconductor side comprises cadmium selenide or cadmium sulfide.

18. The multielectrode photoelectrochemical unit of claim 7 or 8 wherein the gas-evolving sides comprise platinum.

19. The multielectrode photoelectrochemical unit of claim 7 or 8 wherein the undersides comprise cobalt sulfide, lead sulfide or sulfurized brass.

20. The multielectrode photoelectrochemical unit of claim 7 or 8 wherein the ohmic contact layers comprise a metal foil.

21. The multielectrode photoelectrochemical unit of claim 7 or 8 wherein the ohmic contact layers comprise a titanium foil.

22. The multielectrode photoelectrochemical unit of claim 7 or 8 wherein the ohmic contact layers comprise a metallic foil, the semiconductor sides comprise a metal chalcogenide, the undersides comprise cobalt sulfide, lead sulfide or sulfurized brass, the gas-evolving sides comprise platinum and the internal compartments are defined further as being substantially filled with a fluid polysulfide electrolyte.

23. The multielectrode photoelectrochemical unit of claim 7 or 8 wherein the photoelectrically-induced chemical reaction is the decomposition of water to $O_2$ and $H_2$.

* * * * *